(12) United States Patent
Lin et al.

(10) Patent No.: US 11,303,114 B2
(45) Date of Patent: Apr. 12, 2022

(54) PROTECTION CIRCUIT FOR ETHERNET AND POWER SOURCING EQUIPMENT HAVING THE SAME

(71) Applicant: NLightning Technology Ltd., Zhubei (TW)

(72) Inventors: Kun Tsen Lin, Zhubei (TW); Shih Peng Wu, Zhubei (TW)

(73) Assignee: NLIGHTNING TECHNOLOGY LTD., Zhubei (TW)

( * ) Notice: Subject to any disclaimer, the term of this patent is extended or adjusted under 35 U.S.C. 154(b) by 470 days.

(21) Appl. No.: 16/261,713

(22) Filed: Jan. 30, 2019

(65) Prior Publication Data
US 2019/0245344 A1 Aug. 8, 2019

(30) Foreign Application Priority Data

Feb. 2, 2018 (TW) .................................. 107201703
Dec. 25, 2018 (TW) .................................. 107217612

(51) Int. Cl.
*H02H 9/04* (2006.01)

(52) U.S. Cl.
CPC .................................. *H02H 9/045* (2013.01)

(58) Field of Classification Search
CPC ........................................................ H02H 9/045
See application file for complete search history.

(56) References Cited

FOREIGN PATENT DOCUMENTS

TW 201528713 A * 7/2015

* cited by examiner

*Primary Examiner* — Jue Zhang
(74) *Attorney, Agent, or Firm* — McClure, Qualey & Rodack, LLP

(57) ABSTRACT

A protection circuit for Ethernet and a power sourcing equipment having the same are provided. The protection circuit is coupled between a power supply chip and a transmission circuit. The transmission circuit is coupled between an Ethernet chip and an Ethernet connector. The protection circuit includes a bridge rectifier and a protection element to provide the common mode surge protection and the differential mode surge protection at the same time for the power supply chip.

20 Claims, 17 Drawing Sheets

PROTECTION CIRCUIT FOR ETHERNET AND POWER SOURCING EQUIPMENT HAVING THE SAME

PRIORITY

This application claims priority to Taiwan Patent Application No. 107201703 filed on Feb. 2, 2018 and Taiwan Patent Application No. 107217612 filed on Dec. 25, 2018, which are hereby incorporated by reference in their entireties.

CROSS-REFERENCES TO RELATED APPLICATIONS

Not applicable.

BACKGROUND OF THE INVENTION

Field of the Invention

The present invention relates to a protection circuit for Ethernet. More particularly, the protection circuit of the present invention may be set in the power sourcing equipment (PSE) of the Ethernet to provide a surge protection for the PSE.

Descriptions of the Related Art

Ethernet related products have become necessities in people's daily life. The power over Ethernet (PoE) equipment has many applications in life as well. The PoE equipment can be classified into two different types of device: a power sourcing equipment (PSE) and a powered device (PD). The PSE provides direct current (DC) power and/or network communication to the PDs. However, the PSE is vulnerable to the surge (e.g., thunderstroke surge) since the PSE is usually connected to the outdoor web camera or other PDs in order to save extra cost of wiring the power lines.

Accordingly, an urgent need exists in the art to provide a surge protection circuit or a surge protection device which can provide both common mode surge protection and differential mode surge protection to prevent the Ethernet PSE from being damaged by the surge.

SUMMARY OF THE INVENTION

An objective of the present invention is to provide a protection circuit for Ethernet and a power sourcing equipment (PSE) having the same. The protection circuit can provide the Ethernet PSE with both common mode surge protection function and differential mode surge protection function to prevent the Ethernet PSE from being damaged by the surge (e.g., thunderstroke surge) when being used in the outdoor environment.

To achieve the aforesaid objective, the present invention discloses a protection circuit for Ethernet. The protection circuit is configured to be coupled between a power supply chip and a transmission circuit. The transmission circuit is coupled between an Ethernet chip and an Ethernet connector. The protection circuit comprises a first input pin, a second input pin, a first output pin, a second output pin, a first ground pin, a first bridge rectifier and a first protection component. The first input pin is configured to be coupled to the power supply chip. The second input pin is configured to be coupled to the power supply chip. The first output pin is configured to be coupled to a first transmission component set of the transmission circuit. The second output pin is configured to be coupled to a second transmission component set of the transmission circuit. The first ground pin is configured to be coupled to a ground. The first bridge rectifier has four contacts, each of which is coupled to the first input pin and the first output pin, the second input pin, the second output pin, and the first ground pin. The first protection component is coupled between the first output pin and the second output pin.

Moreover, the present invention further discloses a power sourcing equipment which comprises the aforementioned protection circuit.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
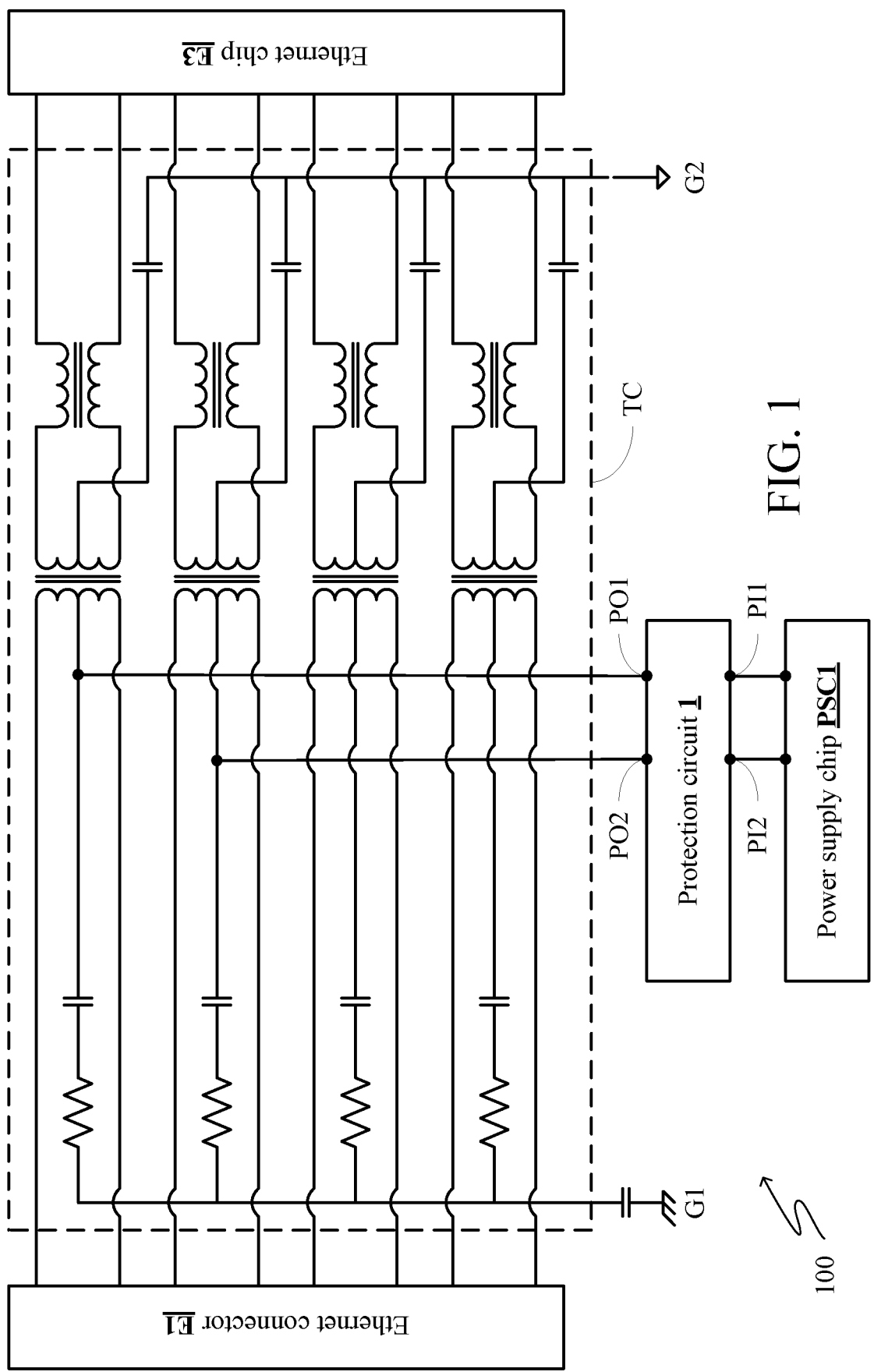
FIG. 1 is an implementation scenario of the protection circuit 1 according to the present invention.

Embodiments described below are intended to illustrate technical contents of the present invention but not to limit the scope of the present invention. It shall be appreciated that, in the following embodiments and the attached drawings, components not related to the present invention are omitted from depiction, and dimensional relationships among individual components in the drawings are only provided for ease of understanding but not to limit the actual scale.

Figure 2:
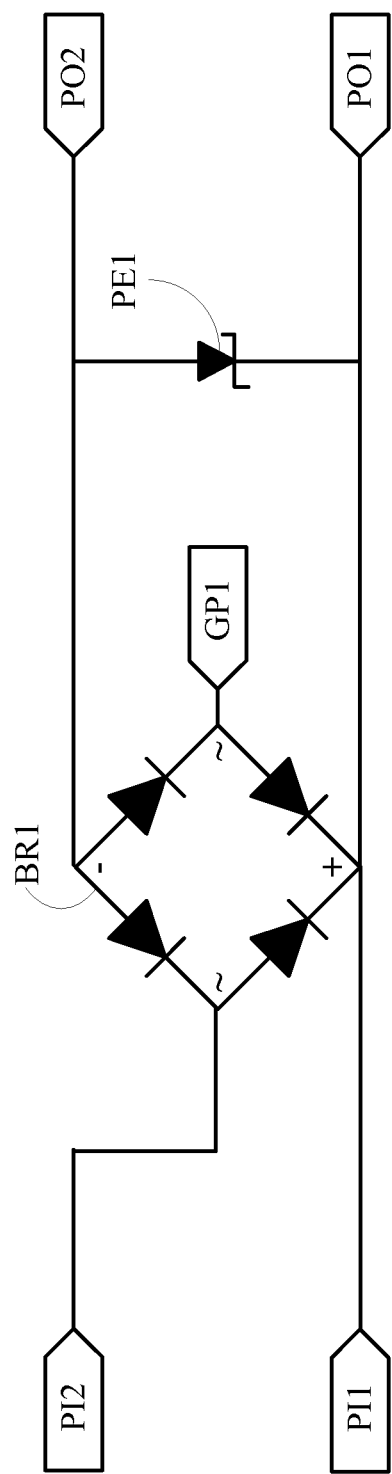
FIG. 2 is a schematic view of the protection circuit 1 according to the present invention.

A first embodiment of the present invention is shown in FIG. 1 and FIG. 2. FIG. 1 is an implementation scenario of the protection circuit 1 according to the present invention. The protection circuit 1 can be used in a power sourcing equipment (PSE) 100 for a Power over Ethernet (PoE) system. The PSE 100 comprises a protection circuit 1, a transmission circuit TC, a power supply chip PSC1, an Ethernet chip E3 and an Ethernet connector E1. The protection circuit 1 is coupled between the power supply chip PSC1 and the transmission circuit TC. The transmission circuit TC is coupled between the Ethernet chip E3 and the Ethernet connector E1. It shall be appreciated that, for simplifying the description, other components of the PSE 100 such as the housing, the power supply module and other components irrelevant to the present invention are omitted from depiction in the drawings.

The Ethernet connector E1 may be an Ethernet connector having an RJ-45 interface, which may include a TX0+ pin, a TX0− pin, a TX1+ pin, a TX1− pin, a TX2+ pin, a TX2− pin, a TX3+ pin, and a TX3− pin. The transmission circuit TC may comprise four transformer components which correspond to four twisted pair and are individually connected between the Ethernet connector E1 and the Ethernet chip E3. The Ethernet chip E3 may be a chip from any chip manufacturer, e.g., the RTL8201 chip from Realtek Semiconductor Corporation, which may include a MD0+ pin, a MD0− pin, a MD1+ pin, a MD1− pin, a MD2+ pin, a MD2− pin, a MD3+ pin, and a MD3− pin. Because the main technical contents of the present invention focus on the protection circuit 1, and the connection relationship among the protection circuit 1, the Ethernet connector E1, the Ethernet chip E3 and the power supply chip PSC1 in the present invention will be readily appreciated by those of ordinary skill in the art based on the following descriptions, such connection relationship will not be further described herein.

FIG. 2 is a schematic view of the protection circuit 1 according to the present invention. The protection circuit 1 comprises a first input pin PI1, a second input pin PI2, a first output pin PO1, a second output pin PO2, a first bridge rectifier BR1 and a first protection component PE1. The first input pin PI1 is configured to be coupled to a positive terminal of the power supply chip PSC1. The second input pin is configured to be coupled to a negative terminal of the power supply chip PSC1.

The first output pin PO1 is configured to be coupled to a first transmission component set of the transmission circuit TC. The second output pin PO2 is configured to be coupled to a second transmission component set of the transmission circuit TC. In detail, the transmission circuit TC includes four transmission component sets, each of which includes a transformer having a center tap. The first output pin PO1 is coupled to the center tap of the transformer of the first transmission component set, and the second output pin PO2 is coupled to the center tap of the transformer of the second transmission component set. The first ground pin GP1 is configured to be coupled to a ground G1. It shall be appreciated that, the ground G1 refers to the ground of the housing of the device (i.e., the external ground); however, the ground G2 refers to the common ground (i.e., the internal ground), usually a voltage of which is 0 V.

It shall be appreciated that, the drawings of the present application are taking the top two transmission component sets of the transmission circuit TC as the first transmission component set and the second transmission component set as example. However, the words "first" and "second" used in the aforesaid terms "the first transmission component set" and "the second transmission component set" are only used to distinguish the different transmission component sets, but not to limit the ordering of the transmission component sets. In practical application, the supplier and the manufacturer of the protection circuit 1 can decide which transmission component set is the first transmission component set or the second transmission component set for different needs. For example, the supplier or the manufacturer can take the top transmission component set and the bottom transmission component set as the first transmission component set and the second transmission component set respectively.

The first bridge rectifier BR1 has four contacts, which are coupled to the first input pin PI1 and the first output pin PO1, the second input pin PI2, the second output pin PO2, and the first ground pin GP1 respectively. Please refer to FIG. 2, the "+" contact on the first bridge rectifier BR1 is the positive contact of the first bridge rectifier BR1, the "−" contact is the negative contact of the first bridge rectifier BR1, the "~" contacts are nonpolar contact of the first bridge rectifier BR1. The two nonpolar contacts are coupled to the second input pin PI2 and the first ground pin GP1 respectively. The positive contact of the first bridge rectifier BR1 is coupled to the first input pin PI1 and the first output pin PO1, and the negative contact is coupled to the second output pin PO2.

The first protection component PE1 is coupled between the first output pin PO1 and the second output pin PO2. For example, as shown in FIGS. 13A-13E, the first protection component PE1 may be one of a unidirectional transient voltage suppressor diode TVS, a bidirectional transient voltage suppressor diode BTVS, a thyristor TSPD, a gas discharge tube GDT and a voltage dependent resistor VDR. For simplification, FIG. 2 only depicts that the first protection component PE1 is implemented by the unidirectional transient voltage suppressor diode TVS. Since the implementation of other protection components shall be appreciated by those of ordinary skill in the art, and thus will not be shown. In addition, the first protection component PE1 in the protection circuit 1 has to be the closest to the first output pin PO1 and the second output pin PO2.

Figure 3:
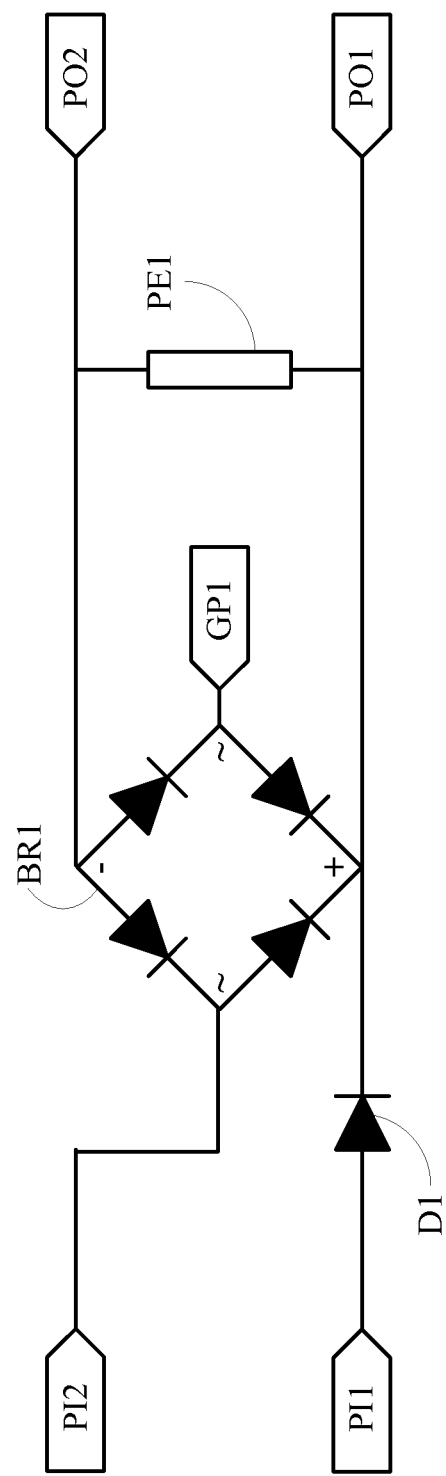
FIG. 3 is a schematic view of the protection circuit 1 according to the present invention.

In other embodiment, the protection circuit 1 further includes a first diode D1 coupled between the first input pin PI1 of the first bridge rectifier BR1. As shown in FIG. 3, the first diode D1 is reversely coupled from the first bridge rectifier BR1 to the first input pin PI1 to further block the external surge.

It shall be noted that, those of ordinary skill in the art understand that the bridge rectifier is formed by four diodes, so the first bridge rectifier BR1 described in the present invention may be a single packaged component includes four diodes or may be constituted by four separate diodes. Thus, such two implementations of the first bridge rectifier BR1 are within the scope of the present invention.

Figure 4:
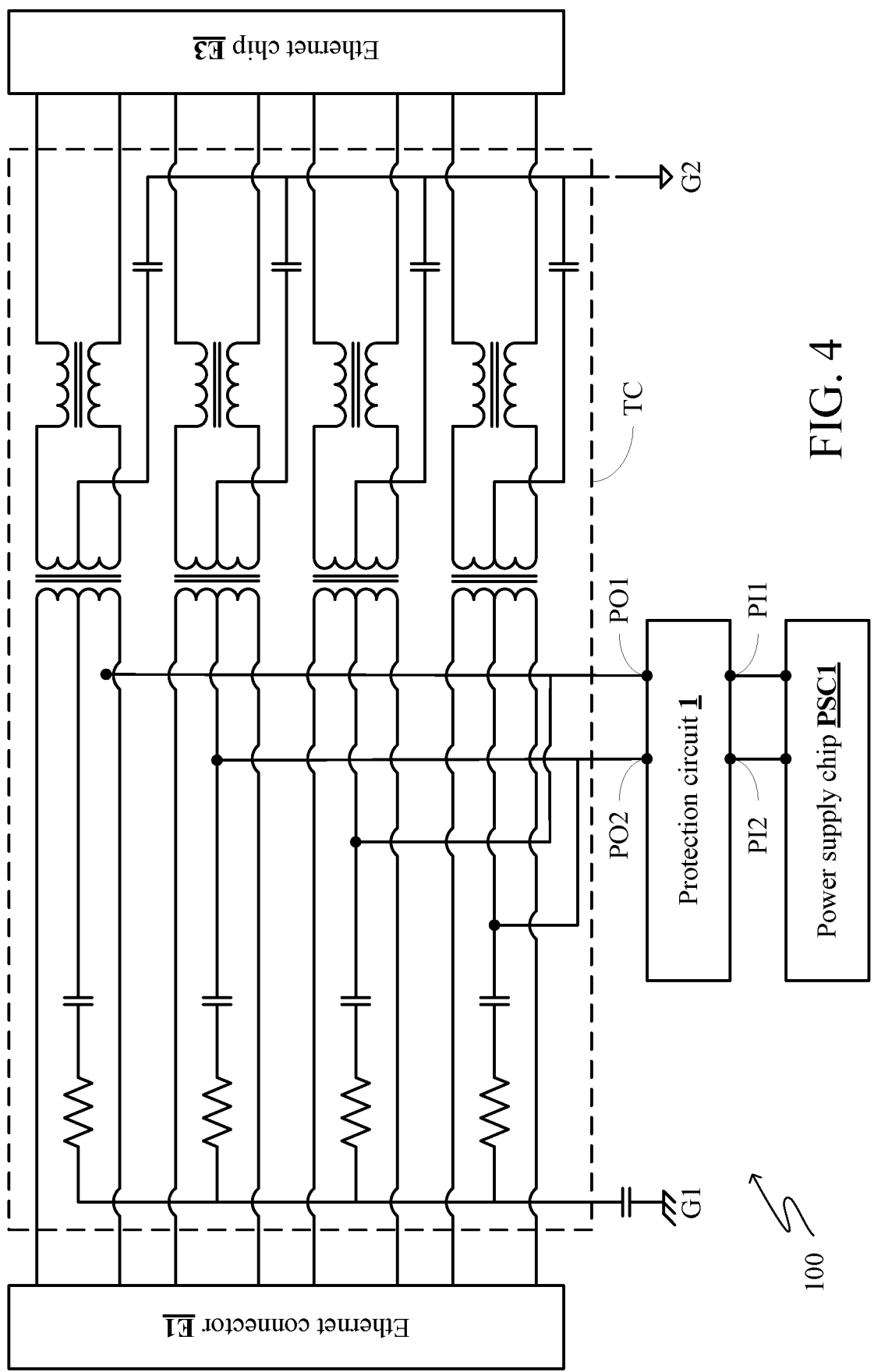
FIG. 4 an implementation scenario of the protection circuit 1 according to the present invention.

A second embodiment of the present invention is as shown in FIG. 4. In this embodiment, the first output pin PO1 of the protection circuit 1 is further coupled to a third transmission component set (i.e., the center tap of the transformer of the third transmission component set) of the transmission circuit TC, and the second output pin PO2 is further coupled to a fourth transmission component set (i.e., the center tap of the transformer of the fourth transmission component set) of the transmission circuit TC.

It shall be appreciated that, similarly, the words "first," "second," "third," and "fourth" of the aforesaid terms "first transmission component set," "the second transmission component set," "the third transmission component set" and "the fourth transmission component set" are only used to distinguish the different transmission component sets, but not to limit the ordering of the transmission component sets. How to arrange these transmission component set in the transmission circuit TC and couple the output pins of the protection circuit 1 to the corresponding transmission component sets in response to various applications shall be appreciated by those of ordinary skill in the art based on the above descriptions, and thus will not be further described herein.

Figure 5:
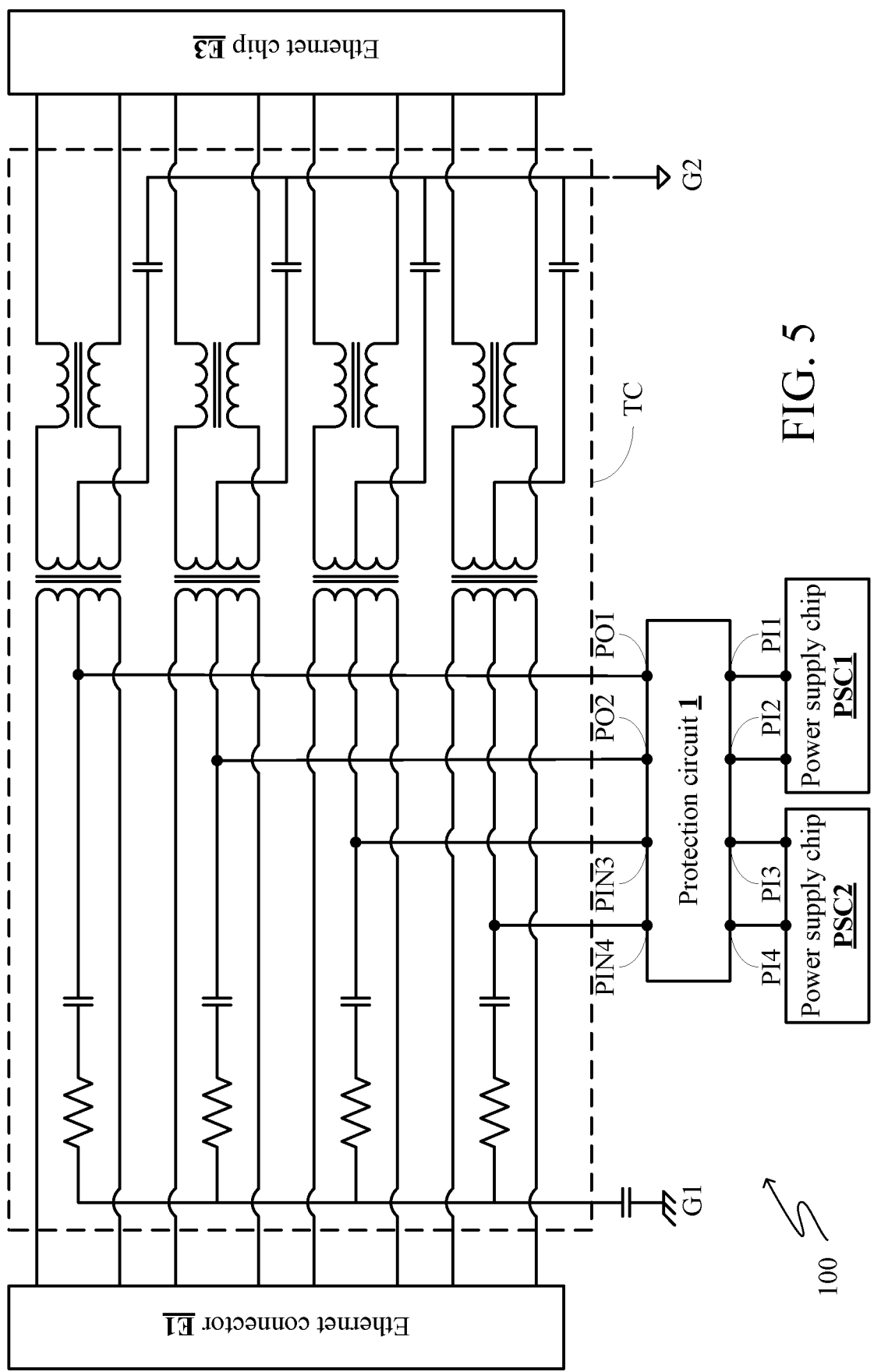
FIG. 5 is an implementation scenario of the protection circuit 1 according to the present invention.
Figure 6:
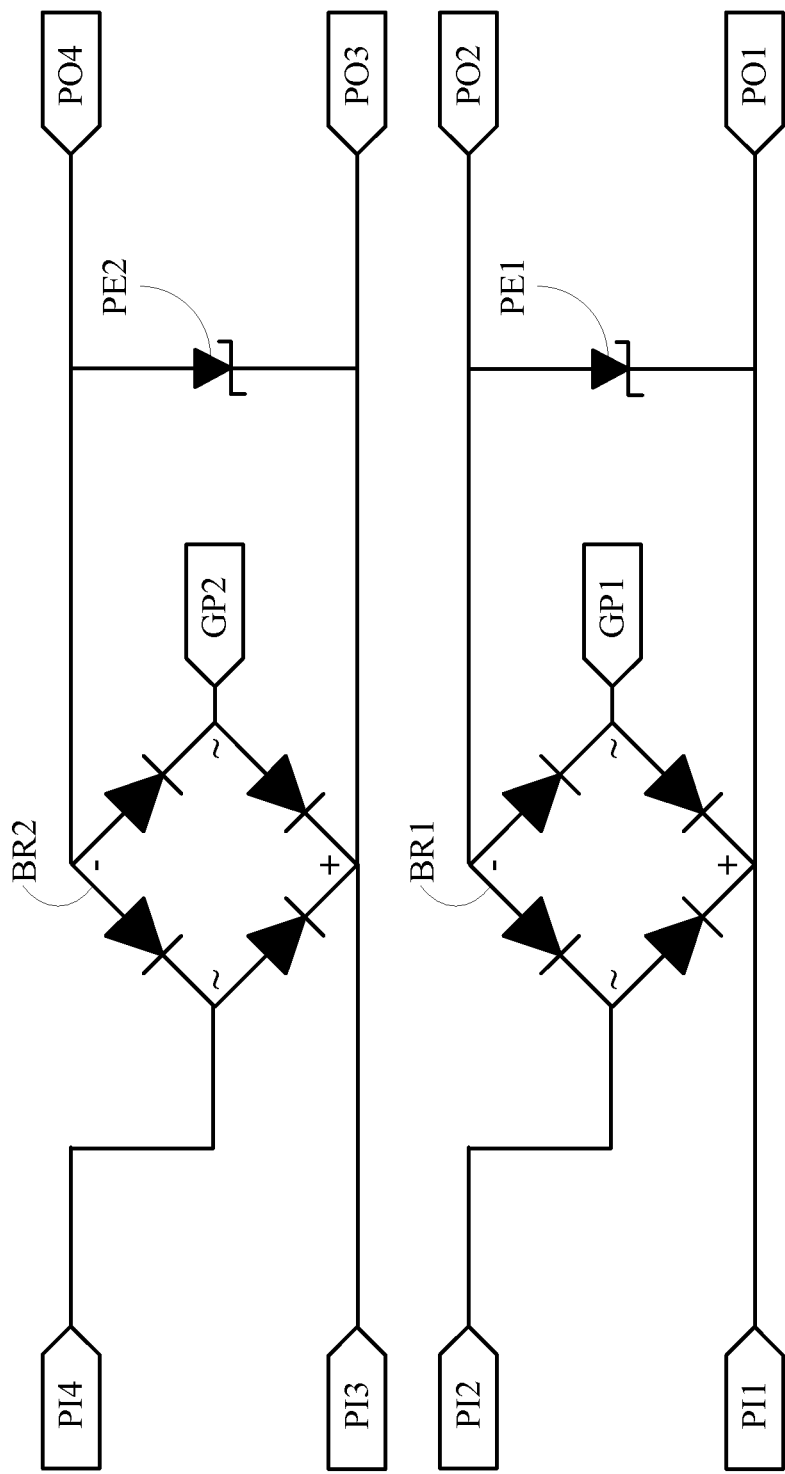
FIG. 6 is schematic views of the protection circuit 1 according to the present invention.

A third embodiment of the present invention is as shown in FIGS. 5-6. The third embodiment is an extension of the first embodiment. In this embodiment, the protection circuit 1 is further configured to be coupled between another power supply chip PSC2 and the transmission circuit TC, as shown in FIG. 5. Next, as shown in FIG. 6, the protection circuit 1 further comprises a third input pin PI3, a fourth input pin PI4, a third output pin PO3, a fourth output pin PO4, a second ground pin GP2, a second bridge rectifier BR2 and a second protection component PE2.

The third input pin PI3 is configured to be coupled to the positive terminal of the power supply chip PSC2. The fourth input pin PI4 is configured to be coupled to the negative terminal of the power supply chip PSC2. The third output pin PO3 is configured to be coupled to a third transmission component set of the transmission circuit TC. The fourth output pin PO4 is configured to be coupled to a fourth transmission component set of the transmission circuit TC. Like the configuration in the first embodiment, the third output pin PO3 is coupled to the center tap of the transformer of the third transmission component set, and the fourth output pin PO4 is coupled to the center tap of the transformer of the fourth transmission component set.

Similarly, the words "first," "second," "third," and "fourth" of the aforesaid terms "first transmission component set," "the second transmission component set," "the third transmission component set" and "the fourth transmission component set" are only used to distinguish the different transmission component sets, but not to limit the ordering of the transmission component sets. How to arrange these transmission component sets in the transmission circuit TC and couple the output pins of the protection circuit 1 to the corresponding transmission component sets in response to various applications shall be appreciated by those of ordinary skill in the art based on the above descriptions, and thus will not be further described herein.

The second bridge rectifier BR2 has four contacts, which are coupled to the third input pin PI3 and the third output pin PO3, the fourth input pin PI4, the fourth output pin PO4, and the second ground pin GP2, respectively. Please refer to FIG. 6, similar to the description in the first embodiment, the "+" contact on the second bridge rectifier BR2 is the positive contact of the second bridge rectifier BR2, the "−" contact is the negative contact of the second bridge rectifier BR2, and the "~" contacts are nonpolar contact of the second bridge rectifier BR2. The two nonpolar contacts are coupled to the fourth input pin PI4 and the second ground pin GP2 respectively. The positive contact of the second bridge rectifier BR2 is coupled to the third input pin PI3 and the third output pin PO3, and the negative contact is coupled to the fourth output pin PO4.

The second protection component PE2 is coupled between the third output pin PO3 and the fourth output pin PO4. For example, each of the first protection component PE1 and the second protection component PE2 is one of a unidirectional transient voltage suppressor diode TVS, a bidirectional transient voltage suppressor diode BTVS, a thyristor TSPD, a gas discharge tube GDT and a voltage dependent resistor VDR. For simplification, FIG. 6 only depicts that the first protection component PE1 and the second protection component PE2 are implemented by the unidirectional transient voltage suppressor diodes TVS. Since the implementation of other protection components shall be appreciated by those of ordinary skill in the art, and thus will not be shown. In addition, the second protection component PE2 in the protection circuit 1 has to be the closest to the third output pin PO3 and the fourth output pin PO4.

Figure 7:
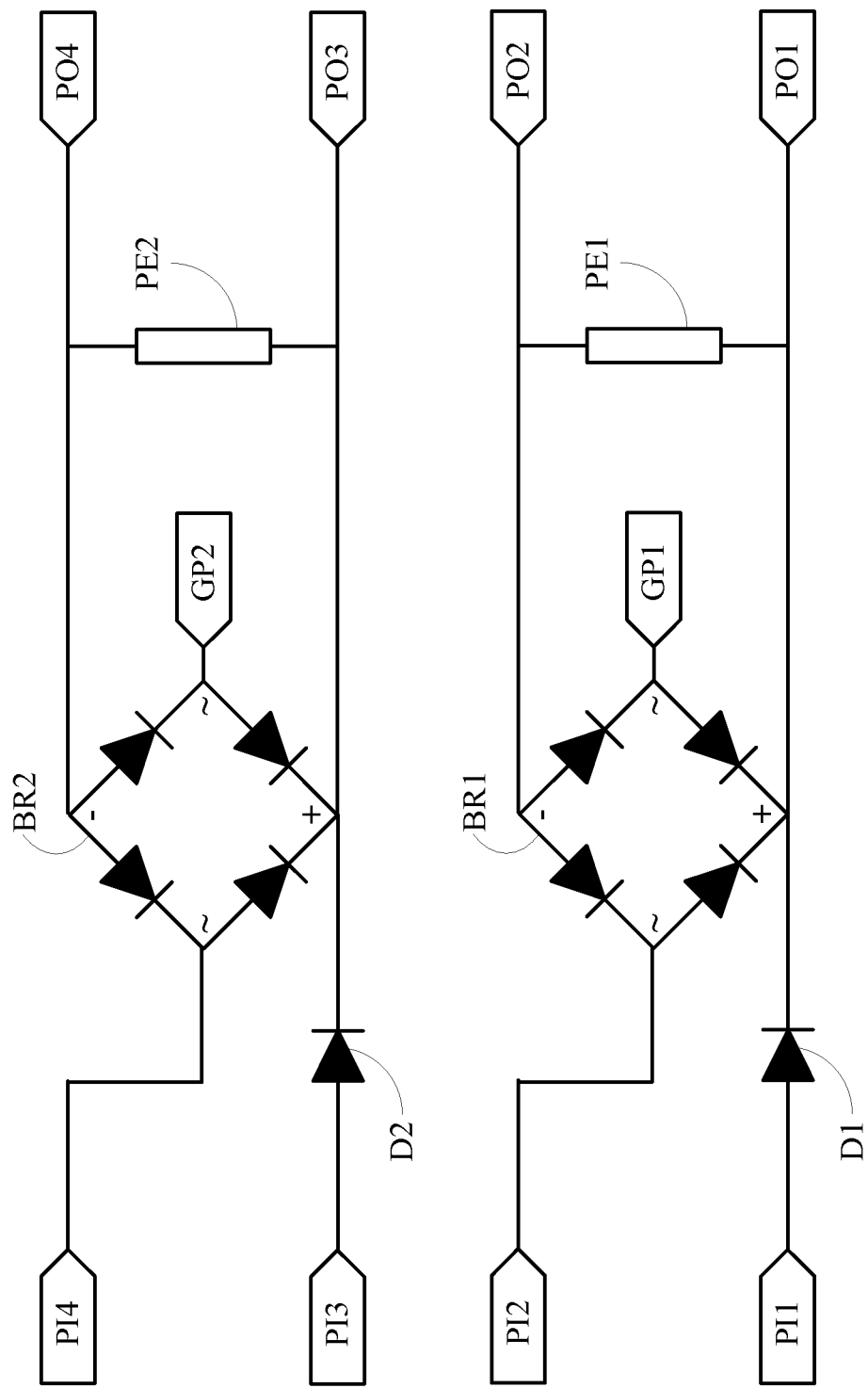
FIG. 7 is schematic views of the protection circuit 1 according to the present invention.

In other embodiment, the protection circuit 1 further includes a second diode D2 which is coupled between the third input pin PI3 and the second bridge rectifier BR2. As shown in FIG. 7, the second diode D2 is reversely coupled from the positive contact of the second bridge rectifier BR2 to the third input pin PI3 to further block the external surge.

Figure 8:
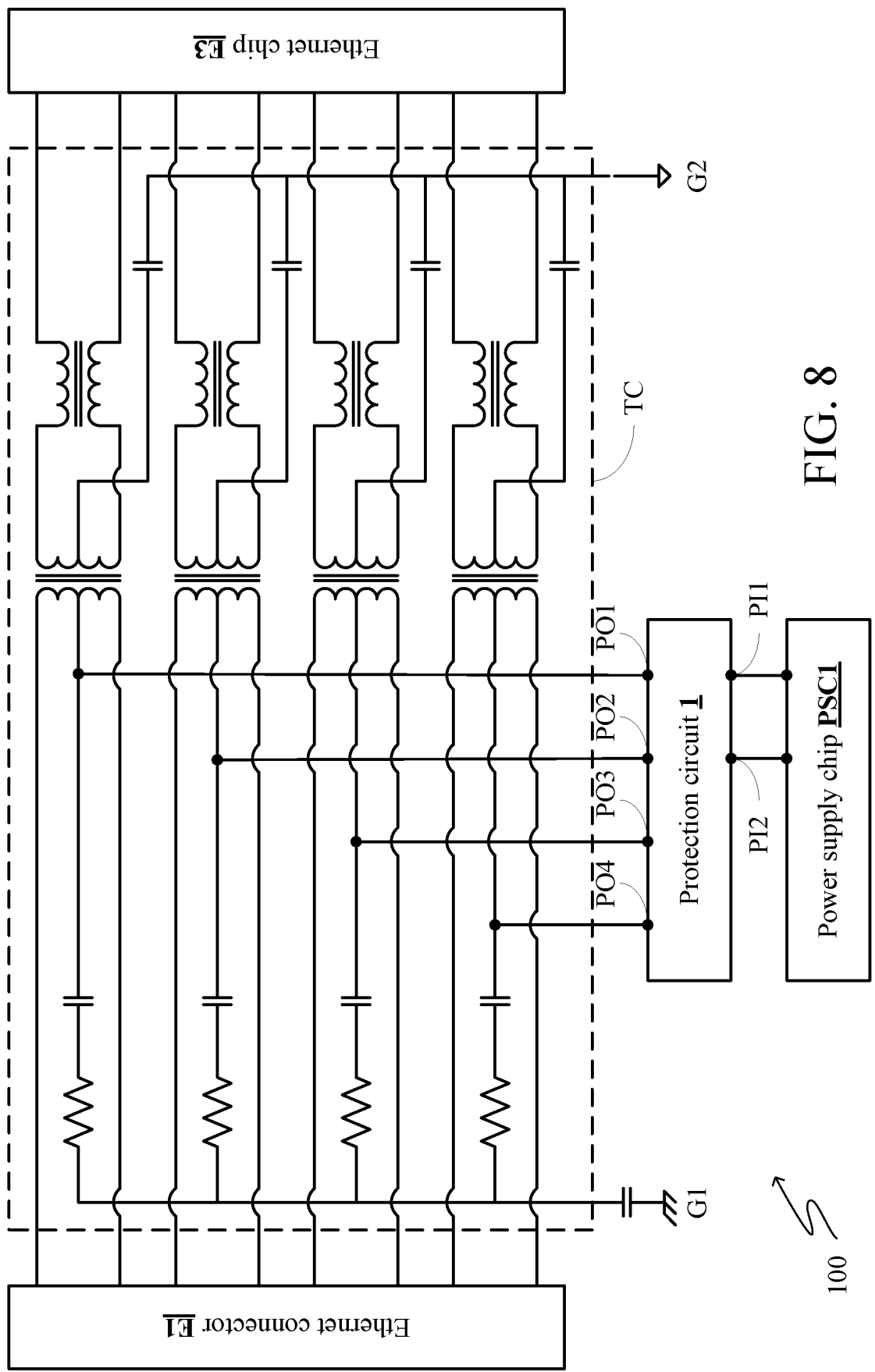
FIG. 8 is an implementation scenario of the protection circuit 1 according to the present invention.
Figure 9:
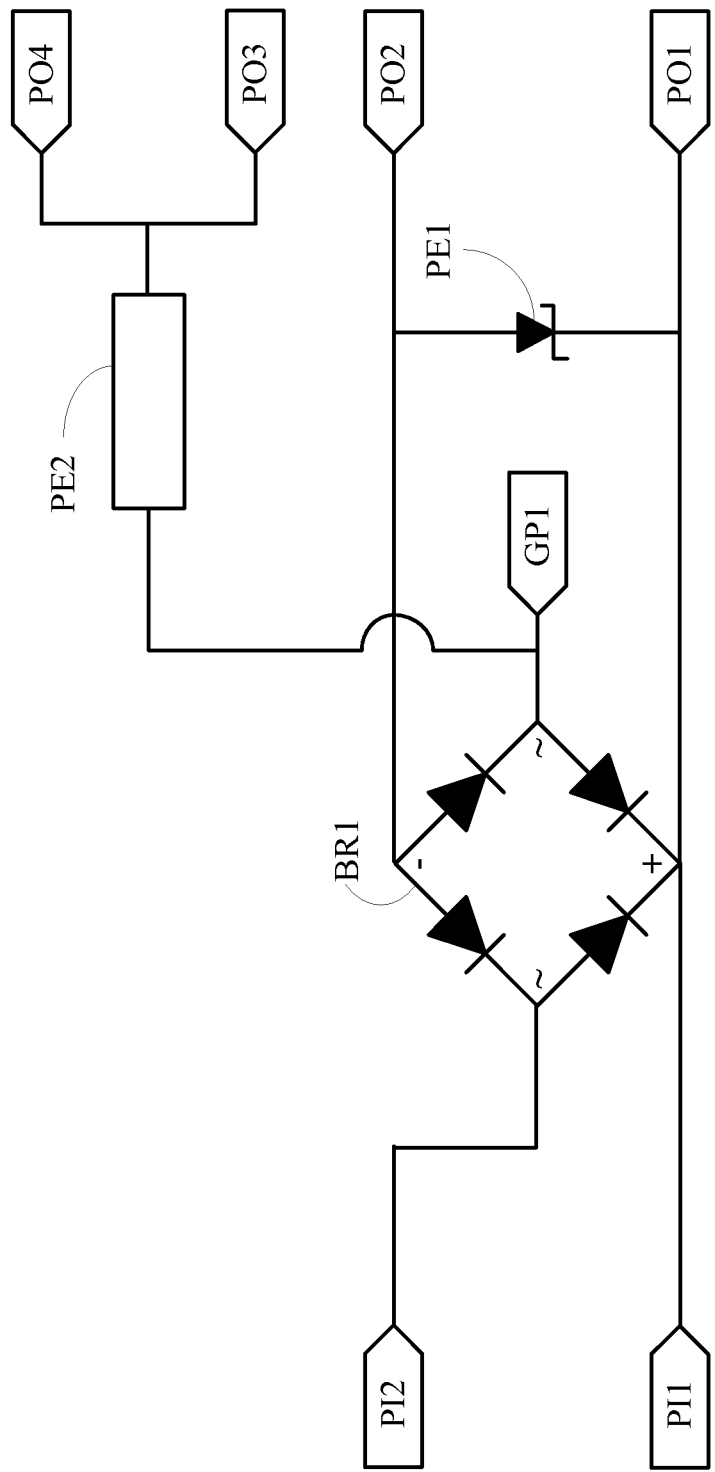
FIG. 9 is a schematic view of the protection circuit 1 according to the present invention.

A fourth embodiment of the present invention is as shown in FIGS. 8-9. The fourth embodiment is an extension of the first embodiment. In this embodiment, the protection circuit 1 further comprises the third output pin PO3, the fourth output pin PO4 and the second protection component PE2. The third output pin PO3 is configured to be coupled to a third transmission component set of the transmission circuit TC. The fourth output pin PO4 is configured to be coupled to a fourth transmission component set of the transmission circuit TC. The second protection component PE2 is configured to couple the third output pin PO3 and the fourth output pin PO4 to the first ground pin GP1. In this embodiment, the second protection component PE2 is one of a unidirectional transient voltage suppressor diode TVS, a bidirectional transient voltage suppressor diode BTVS, a thyristor TSPD, a gas discharge tube GDT and a voltage dependent resistor VDR.

Figure 10:
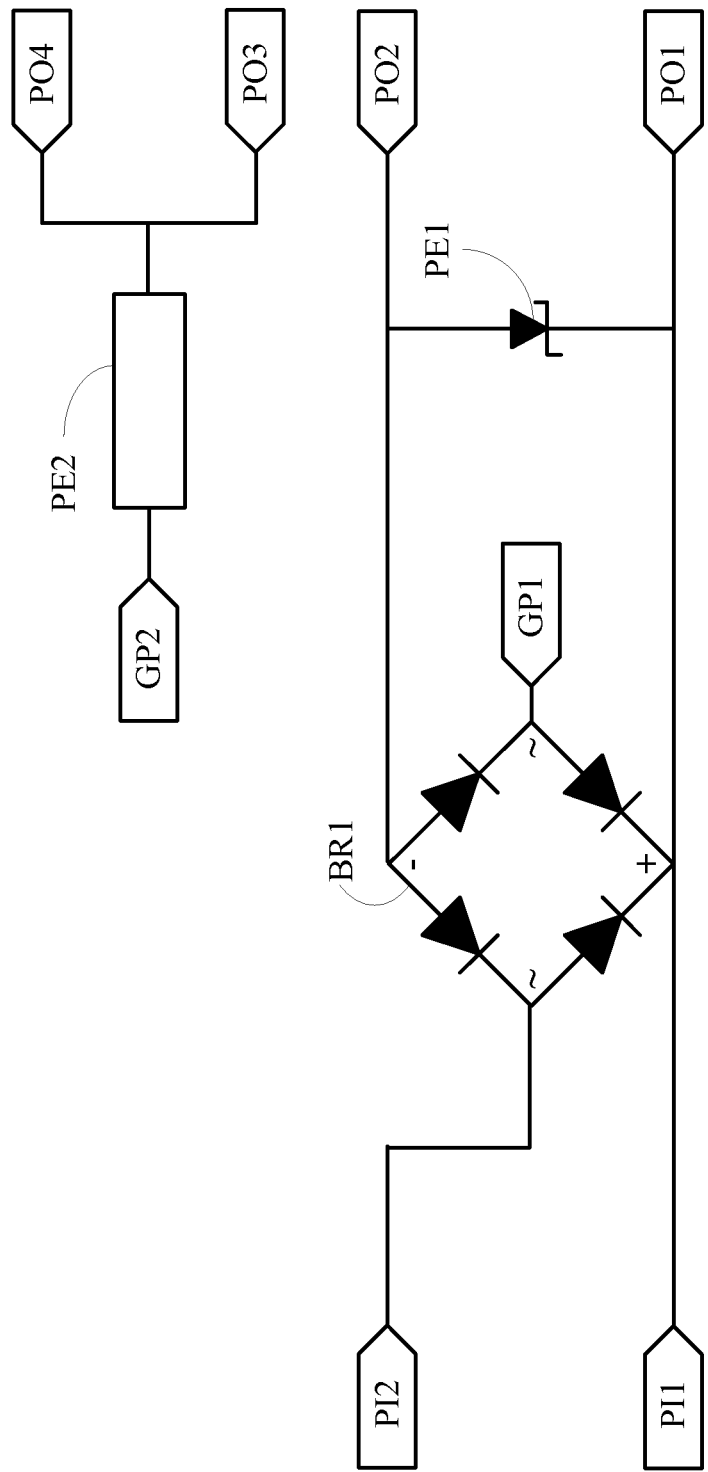
FIG. 10 is a schematic view of the protection circuit 1 according to the present invention.
Figure 11:
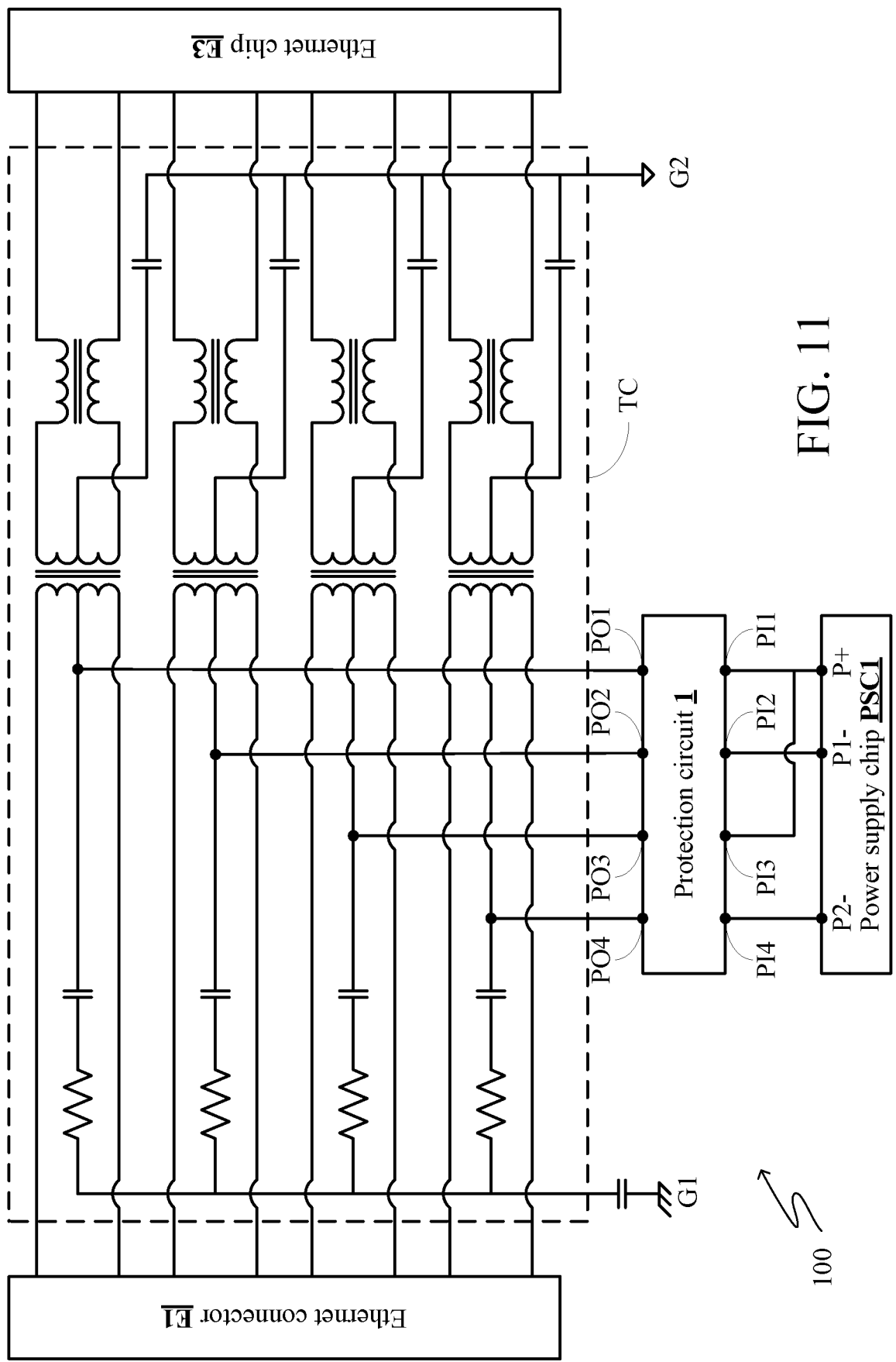
FIG. 11 is an implementation scenario of the protection circuit 1 according to the present invention.

A fifth embodiment of the present invention is as shown in FIG. 10. Unlike the fourth embodiment, in this embodiment, the protection circuit 1 further comprises the second ground pin GP2 which is configured to be coupled to the ground G1. The second protection component PE2 is configured to couple the third output pin PO3 and the fourth output pin PO4 to the second ground pin GP2.

A sixth embodiment of the present invention is as shown in FIGS. 11-12 and FIGS. 13A-13E. The sixth embodiment is an extension of the first embodiment. In this embodiment, the protection circuit 1 further includes a third input pin PI3, a fourth input pin PI4, a third output pin PO3, a fourth output pin PO4, a second protection component PE2, a second bridge rectifier BR2, a first resistor R1 and a second resistor R2.

Specifically, the first input pin PI1 is further configured to be coupled to a positive terminal P+ of the power supply chip PSC1. The second input pin PI2 is further configured to be coupled to a first negative terminal P1− of the power supply chip PSC1. The third input pin PI3 is configured to be coupled to the positive terminal P+ of the power supply chip PSC1. The fourth input pin PI4 is configured to be coupled to a second negative terminal P2− of the power supply chip PSC1. The first output pin PO1 is configured to be coupled to a first transmission component set of the transmission circuit TC. The second output pin PO2 is configured to be coupled to a second transmission component set of the transmission circuit TC. The third output pin PO3 is configured to be coupled to a third transmission component set of the transmission circuit TC. The fourth output pin PO4 is configured to be coupled to a fourth transmission component set of the transmission circuit TC.

The first protection component PE1 is coupled between the first output pin PO1 and the second output pin PO2. The second protection component PE2 is coupled between the third output pin PO3 and the fourth output pin PO4. For example, please refer to FIGS. 13A-13E, each of the first protection component PE1 and the second protection component PE2 is one of a unidirectional transient voltage suppressor diode TVS, a bidirectional transient voltage suppressor diode BTVS, a thyristor TSPD, a gas discharge tube GDT and a voltage dependent resistor VDR.

Figure 12:
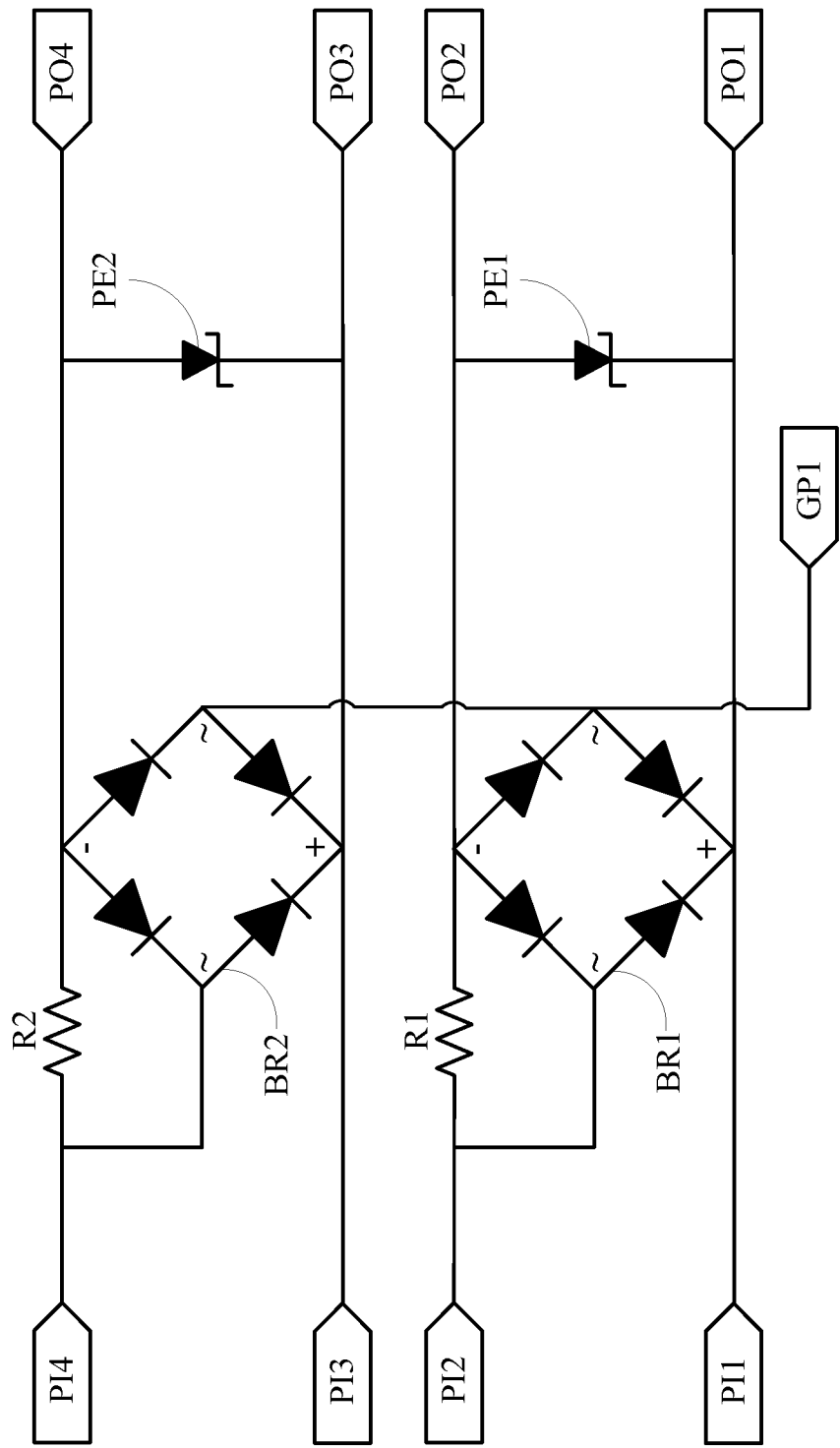
FIG. 12 is a schematic view of the protection circuit 1 according to the present invention.
Figure 13C:
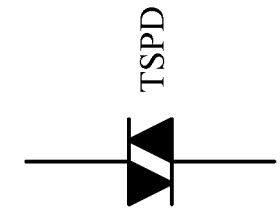
FIGS. 13A-13E are schematic views of the first protection component PE1 and the second protection component PE2 according to the present invention.
Figure 13E:
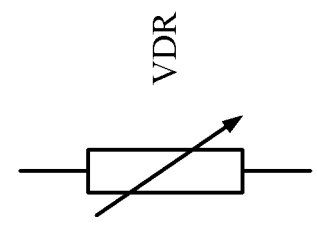
Figure 13B:
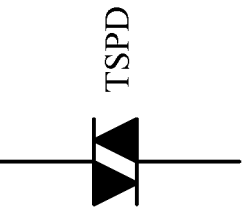
Figure 13D:
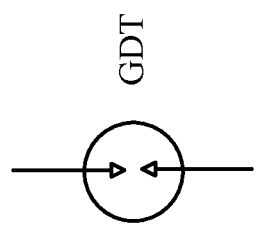
Figure 13A:

For simplification, FIG. 12 only depicts that the first protection component PE1 and the second protection component PE2 are implemented by the unidirectional transient voltage suppressor diode TVS. Since the implementation of other protection components shall be appreciated by those of ordinary skill in the art, and thus will not be shown. In addition, in the protection circuit 1, the first protection component PE1 that has to be the closest to the first output pin PO1 and the second output pin PO2, and the second protection component PE2 that has to be the closet to the third output pin PO3 and the fourth output pin PO4.

The first bridge rectifier BR1 has four contacts, which are coupled to the first input pin PI1 and the first output pin PO1, the second input pin PI2, the second output pin PO2, and the first ground pin GP1, respectively. The second bridge rectifier BR2 has four contacts, which are coupled to the third input pin PI3 and the third output pin O3, the fourth input pin PI4, the fourth output pin PO4 and the first ground pin GP1, respectively. The first ground pin GP1 is configured to be coupled to a ground G1.

The two nonpolar contacts of the first bridge rectifier BR1 are coupled to the first ground pin GP1 and the second input pin PI2 respectively. The positive contact of the first bridge rectifier BR1 is coupled to the first input pin PI1 and the first output pin PO1. The negative connection point of the first bridge rectifier BR1 is coupled to the second output pin PO2. The two nonpolar contacts of the second bridge rectifier BR2 are coupled to the first ground pin GP1 and the fourth input pin PI4 respectively. The positive contact of the second bridge rectifier BR2 is coupled to the third input pin PI3 and the third output pin PO3. The negative contact of the second bridge rectifier BR2 is coupled to the fourth output pin PO4.

The first resistor R1 is coupled between two contacts of the four contacts of the first bridge rectifier BR1 (i.e., between the negative contact and the nonpolar which is coupled to the second input pin PI2). The two contacts of the first bridge rectifier BR1 are coupled to the second input pin PI2 and the second output pin PO2 respectively. In other words, the first resistor R1 may be equivalent to bridging the diode between the contact coupled to the second input point PI2 and the contact coupled to the second output pin PO2. The second resistor R2 is coupled between two contacts of the four contacts of the second bridge rectifier BR2 (i.e., between the negative connection point and the nonpolar which is coupled to the fourth input pin PI4). The two contacts of the second bridge rectifier BR2 are coupled to the fourth input pin PI4 and the fourth output pin PO4 respectively. In other words, the second resistor R2 is equivalent to bridging the diode between the contact coupled to the fourth input point PI4 and the contact coupled to the fourth output pin PO4.

The first resistor R1 and second resistor R2 is mainly used to form a discharging path. To be more specific, when encountering surges (e.g., thunderstroke), although the protection circuit 1 can avoid the surge flowing into the power supply chip PSC1, the circuit of the power supply chip PSC1 still have capacitive characteristics which may lead the power supply chip PSC1 to store charge. Since some power supply chips PSC1 (e.g., the TI TPS23880 chip from Texas Instruments) may have slower discharge rate when only discharging through its internal circuit, and the diodes of the first bridge rectifier BR1 and the second bridge rectifier BR2 (e.g., the diode connected to the second input pin PI2 and the fourth input pin PI4) are reversely coupled to the power supply chip, these power supply chips PSC1 will not discharge through the second input pin PI2 and the fourth input pin PI4. Moreover, if the protection mechanism of the power supply chip PSC1 is triggered when encountering thunderstroke surges, the power supply chip PSC1 will restart. In such a situation, once the power supply chip PSC1 still has the charge stored, the charge may make the power supply chip PSC1 unable to restart normally so as to make the power supply chip PSC1 not work normally. In order to let the protection circuit 1 be more usable in these power supply chips, the present invention further add the first resistor R1 and the second resistor R2 to provide additional path for releasing the charge. Furthermore, to avoid the influences on supplying power due to the first resistor R1 and the second resistor R2, the resistances of the first resistor R1 and the second resistor R2 may be chosen to be about 10 k ohm ($\Omega$), but not limited thereto.

Figure 14:
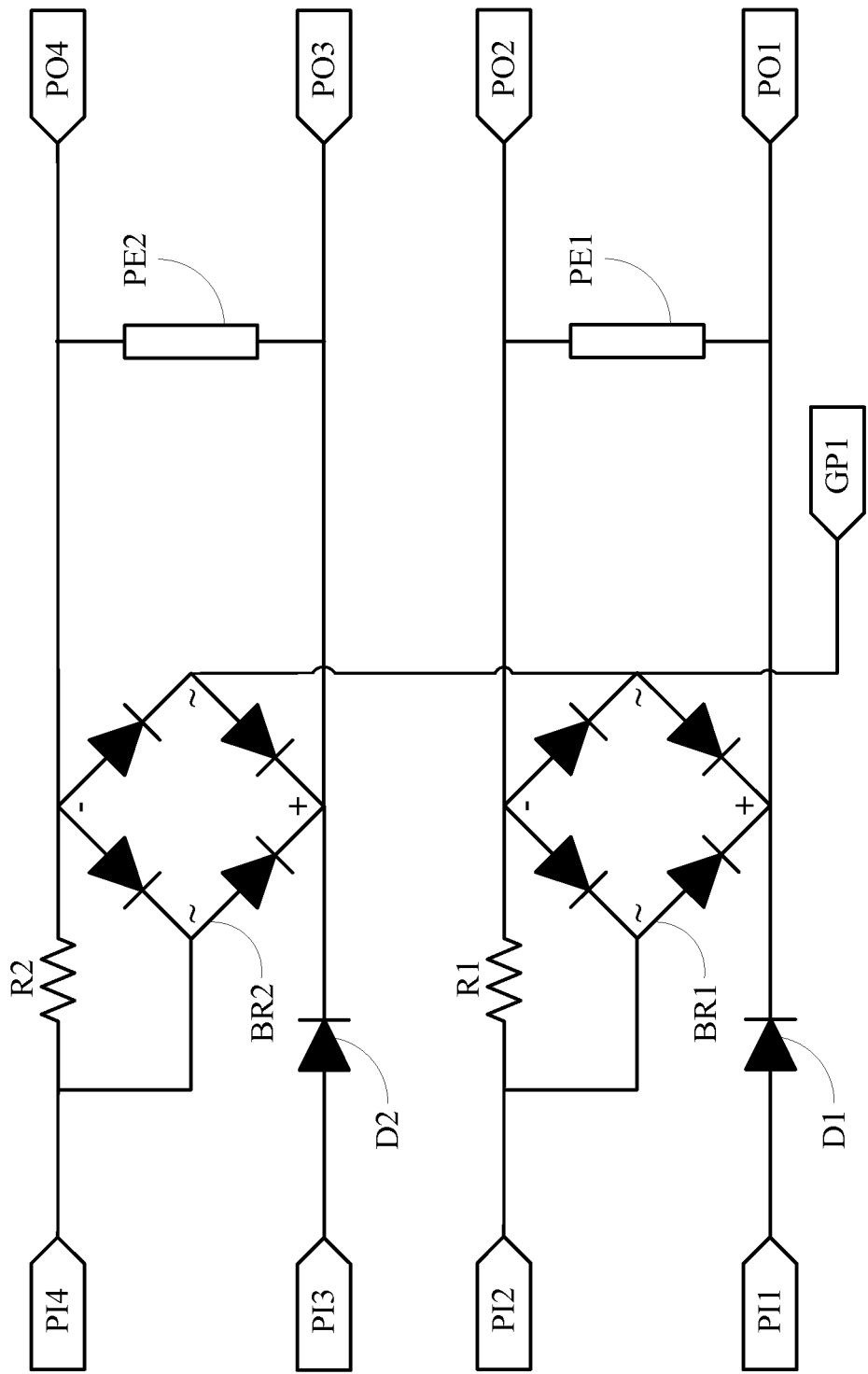
FIG. 14 is an implementation scenario of the protection circuit 1 according to the present invention.

A seventh embodiment of the present invention is as shown in FIG. 14. The seventh embodiment is an extension of the first embodiment. In this embodiment, the protection circuit 1 further includes a first diode D1 and a second diode D2. The first diode D1 is coupled between the first input pin PI1 and the first bridge rectifier BR1. The second diode D2 is coupled between the third input pin PI3 and the second bridge rectifier BR2. As shown in FIG. 14, to further block the external surge, the first diode D1 is reversely coupled from the positive contact of the first bridge rectifier BR1 to the first input pin PI1, and the second diode D2 is coupled from the positive contact of the second bridge rectifier BR2 to the third input pin PI3.

Figure 15:
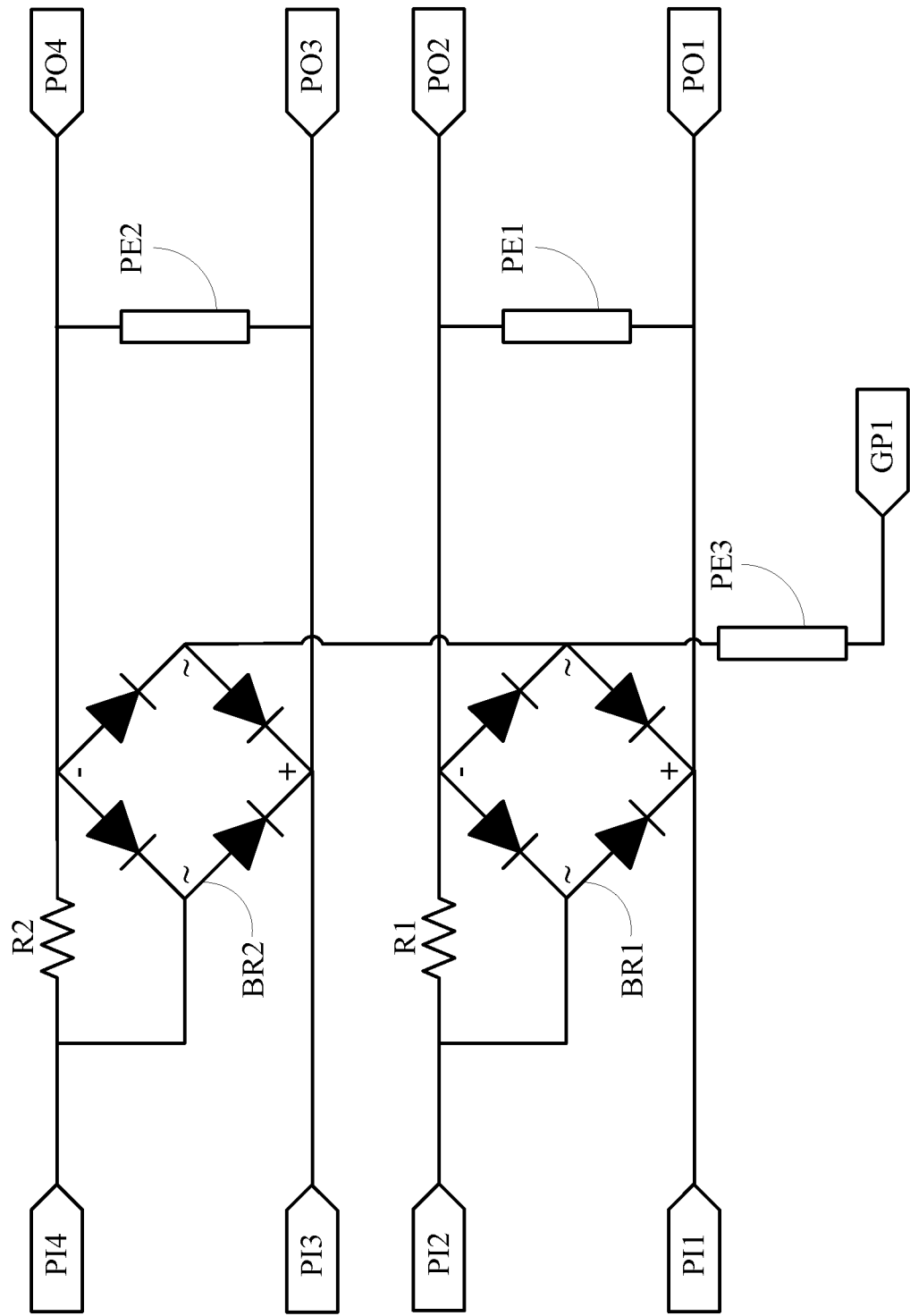
FIG. 15 is an implementation scenario of the protection circuit 1 according to the present invention.
Figure 16:
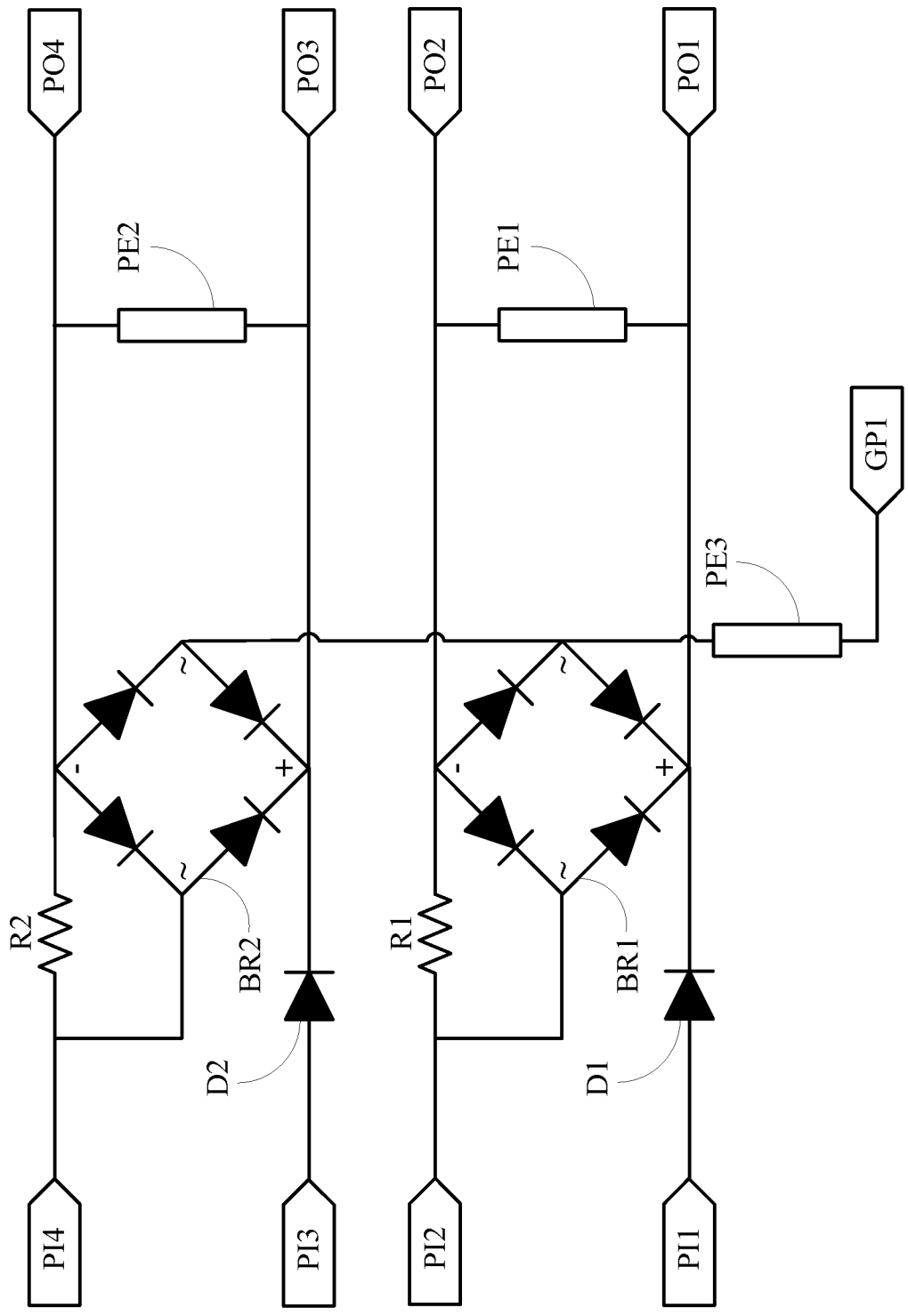
FIG. 16 is an implementation scenario of the protection circuit 1 according to the present invention.
Figure 17B:
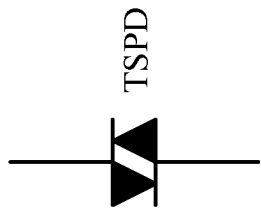
FIGS. 17A-17D are schematic views of the third protection component PE3 according to the present invention.
Figure 17D:
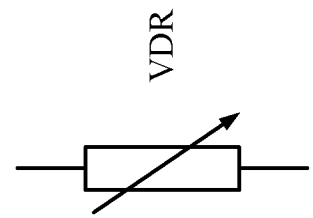
Figure 17A:
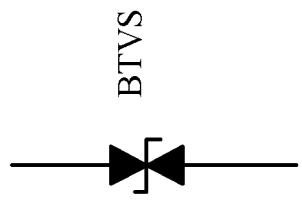
Figure 17C:
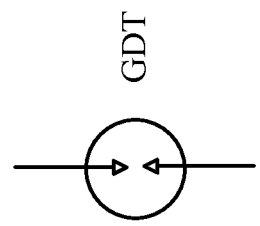

An eighth embodiment of the present invention is as shown in FIGS. 15-17. The eighth embodiment is an extension of the sixth embodiment and the seventh embodiment. In previous embodiments, the first bridge rectifier BR1 and the second bridge rectifier BR2 are coupled to the first ground pin GP1 directly and coupled to the ground G1 through the first ground pin GP1. The ground G1 is the ground outside the system, and the ground is also the reference ground of the alternating current power supply. However, the ground G1 may exist voltage (noise signal or alternating current voltage), therefore, the system circuit may be interfered if the ground G1 is not clean. Thus, in this embodiment, the protection circuit 1 further includes a third protection component PE3 to prevent interference caused by the unclean ground G1.

For example, as shown in FIG. 15, the third protection component PE3 further couples the first bridge rectifier BR1 and the second rectifier BR2 to the first ground pin GP1 of the protection circuit 1 with respect to the sixth embodiment. Similarly, as shown in FIG. 16, the third protection component PE3 further couples the first bridge rectifier BR1 and the second rectifier BR2 to the first ground pin GP1 of the protection circuit 1 with respect to the seventh embodiment.

The third protection component PE3 is one of a bidirectional transient voltage suppressor diode BTVS, a thyristor TSPD, a gas discharge tube GDT and a voltage dependent resistor VDR, as shown in FIGS. 17A-17D. The third protection component PE3 can further enhance the protection ability of the protection circuit 1, and also can be shared for different circuit channel, as shown in FIGS. 15-16, the first bridge rectifier BR1 and the second bridge rectifier BR2 are coupled to the first ground pin GP1 through the third protection component PE3. It shall be noted that, in this embodiment, the first bridge rectifier BR1 and the second bridge rectifier BR2 are coupled to the first ground pin GP1 through the third protection component PE3 in common. However, in other embodiment, the first bridge rectifier BR1 and the second bridge rectifier BR2 may be coupled to the first ground pin GP1 through different third protection components PE3 respectively. Moreover, in this embodiment, the first bridge rectifier BR1 and the second bridge rectifier BR2 share the first ground pin GP1. However, in other embodiment, the first bridge rectifier BR1 and the second bridge rectifier BR2 may also be coupled to different first ground pins GP1 respectively.

According to the above descriptions, the protection circuit of the present invention can provide the power supply chip with both common mode surge protection and differential mode surge protection. To be more specific, to prevent the common mode surge and the differential mode surge from entering the power supply chip, the protection circuit provides a path to the ground for the common mode surge, and directs the differential mode surge, which comes from one output pin, to the other output pin through the bridge rectifier and/or the protection component. Besides, by adding the resistors to the protection circuit, the protection circuit can provide the power supply chip with a path for releasing the charge, and by adding the protection component which is connected to the ground, the protection ability of the protection circuit can be strengthened. Compared to the conventional protection circuit, the protection circuit of the present invention can use fewer electronic components and reduce the cost. In addition, the protection circuit can be further packaged into a single component and integrated into Ethernet connector socket to significantly save space on the printed circuit board (PCB). Besides, if other electronic devices behind the protection circuit are also connected to the power supply chip, the protection circuit of the present invention can also protect these electronic devices at the same time from being damaged by the common mode surge and the differential mode surge.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A protection circuit for Ethernet, the protection circuit being configured to be coupled between a power supply chip and a transmission circuit, the transmission circuit being coupled between an Ethernet chip and an Ethernet connector, the protection circuit comprising:
   a first input pin, being configured to be coupled to the power supply chip;
   a second input pin, being configured to be coupled to the power supply chip;
   a first output pin, being configured to be coupled to a first transmission component set of the transmission circuit;
   a second output pin, being configured to be coupled to a second transmission component set of the transmission circuit;
   a first ground pin, being configured to be coupled to a ground;
   a first bridge rectifier having four contacts coupled to the first input pin and the first output pin, the second input pin, the second output pin, and the first ground pin, wherein the first input pin and the first output pin are coupled to a same one of the four bridge rectifier contacts, and wherein the bridge rectifier contact coupled to the ground pin not coupled to any of the first input pin, the second input pin, the first output pin, or the second output pin; and
   a first protection component, being coupled between the first output pin and the second output pin.

2. The protection circuit of claim 1, wherein the first output pin is further coupled to a third transmission component set of the transmission circuit and the second output pin is further coupled to the fourth transmission component set of the transmission circuit.

3. The protection circuit of claim 1, wherein the protection circuit further comprises a first diode, and the first diode is reversely coupled from the first bridge rectifier to the first input pin.

4. The protection circuit of claim 1, wherein the first protection component is one of a unidirectional transient voltage suppressor diode, a bidirectional transient voltage suppressor diode, a thyristor, a gas discharge tube and a voltage dependent resistor.

5. The protection circuit of claim 1, wherein the protection circuit is further configured to be coupled between another power supply chip and the transmission circuit, and the protection circuit further comprises:
   a third input pin, being configured to be coupled to the another power supply chip;
   a fourth input pin, being configured to be coupled to the another power supply chip;
   a third output pin, being configured to be coupled to a third transmission component set of the transmission circuit;
   a fourth output pin, being configured to be coupled to a fourth transmission component set of the transmission circuit;
   a second ground pin, being configured to be coupled to the ground;
   a second bridge rectifier having four contacts coupled to the third input pin and the third output pin, the fourth input pin, the fourth output pin, and the second ground pin respectively; and
   a second protection component, being coupled between the third output pin and the fourth output pin.

6. The protection circuit of claim 5, wherein the protection circuit further comprises a first diode, the first diode is reversely coupled from the second bridge rectifier to the third input pin.

7. The protection circuit of claim 5, wherein each of the first protection component and the second protection component is one of a unidirectional transient voltage suppressor diode, a bidirectional transient voltage suppressor diode, a thyristor, a gas discharge tube and a voltage dependent resistor.

8. The protection circuit of claim 1 further comprising:
   a third output pin, being configured to be coupled to a third transmission component set of the transmission circuit;
   a fourth output pin, being configured to be coupled to a fourth transmission component set of the transmission circuit; and
   a second protection component, being configured to couple the third output pin and the fourth output pin to the first ground pin.

9. The protection circuit of claim 8, wherein the second protection component is one of a unidirectional transient voltage suppressor diode, a bidirectional transient voltage suppressor diode, a thyristor, a gas discharge tube and a voltage dependent resistor.

10. The protection circuit of claim 1, further comprising:
a third output pin, being configured to be coupled to a third transmission component set of the transmission circuit;
a fourth output pin, being configured to be coupled to a fourth transmission component set of the transmission circuit;
a second ground pin, being configured to be coupled to the ground; and
a second protection component, being configured to couple the third output pin and the fourth output pin to the second ground pin.

11. The protection circuit of claim 1, wherein the first input pin is further configured to be coupled to a positive terminal of the power supply chip and the second input pin is further configured to be coupled to a first negative terminal of the power supply chip, and the protection circuit further comprises:
a third input pin, being configured to be coupled to the positive terminal of the power supply chip;
a fourth input pin, being configured to be coupled to a second negative terminal of the power supply chip;
a third output pin, being configured to be coupled to a third transmission component set of the transmission circuit;
a fourth output pin, being configured to be coupled to a fourth transmission component set of the transmission circuit;
a second protection component, being coupled between the third output pin and the fourth output pin;
a second bridge rectifier having four contacts coupled to the third input pin and the third output pin, the fourth input pin, the fourth output pin and the first ground pin respectively;
a first resistor, being coupled between two contacts of the four contacts of the first bridge rectifier, the two contacts of the first bridge rectifier being coupled to the second input pin and the second output pin respectively; and
a second resistor, being coupled between two contacts of the four contacts of the second bridge rectifier, the two contacts of the second bridge rectifier being coupled to the fourth input pin and the fourth output pin respectively.

12. The protection circuit of claim 11, wherein each of the first protection component and the second protection component is one of a unidirectional transient voltage suppressor diode, a bidirectional transient voltage suppressor diode, a thyristor, a gas discharge tube and a voltage dependent resistor.

13. The protection circuit of claim 11, wherein the protection circuit further comprises a first diode and a second diode, the first diode is reversely coupled from the first bridge rectifier to the first input pin, and the second diode is reversely coupled from the second bridge rectifier to the third input pin.

14. The protection circuit of claim 11, wherein the protection circuit further comprises a third protection component coupling the first bridge rectifier and the second bridge rectifier to the first ground pin.

15. The protection circuit of claim 14, wherein the third protection component is one of a bidirectional transient voltage suppressor diode, a thyristor, a gas discharge tube and a voltage dependent resistor.

16. A power sourcing equipment, comprising:
an Ethernet chip;
an Ethernet connector;
a power supply chip;
a transmission circuit, being coupled between the Ethernet chip and the Ethernet connector;
a protection circuit, being coupled between the power supply chip and the transmission circuit, the protection circuit comprising:
a first input pin coupled to the power supply chip;
a second input pin coupled to the power supply chip;
a first output pin coupled to a first transmission component set of the transmission circuit;
a second output pin coupled to a second transmission component set of the transmission circuit;
a first ground pin coupled to a ground;
a first bridge rectifier having four contacts coupled to the first input pin and the first output pin, the second input pin, the second output pin, and the first ground pin, wherein the first input pin and the first output pin are coupled to a same one of the four bridge rectifier contacts, and wherein the bridge rectifier contact coupled to the ground pin not coupled to any of the first input pin, the second input pin, the first output pin, or the second output pin; and
a first protection component coupled between the first output pin and the second output pin.

17. The power sourcing equipment of claim 16, wherein the first input pin is coupled to a positive terminal of the power supply chip and the second input pin is coupled to a first negative terminal of the power supply chip, and the protection circuit further comprises:
a third input pin coupled to the positive terminal of the power supply chip;
a fourth input pin coupled to a second negative terminal of the power supply chip;
a third output pin coupled to a third transmission component set of the transmission circuit;
a fourth output pin coupled to a fourth transmission component set of the transmission circuit;
a second protection component coupled between the third output pin and the fourth output pin;
a second bridge rectifier having four contacts coupled to the third input pin and the third output pin, the fourth input pin, the fourth output pin, and the first ground pin respectively;
a first resistor coupled between two contacts of the four contacts of the first bridge rectifier, the two contacts of the first bridge rectifier being coupled to the second input pin and the second output pin respectively; and
a second resistor coupled between two contacts of the four contacts of the second bridge rectifier, the two contacts of the second bridge rectifier being coupled to the fourth input pin and the fourth output pin respectively.

18. The power sourcing equipment of claim 17, wherein the protection circuit further comprises a first diode and a second diode, the first diode is reversely coupled from the first bridge rectifier to the first input pin, and the second diode is reversely coupled from the second bridge rectifier to the third input pin.

19. The power sourcing equipment of claim 17, wherein the protection circuit further comprises a third protection component coupling the first bridge rectifier and the second bridge rectifier to the first ground pin.

20. The power sourcing equipment of claim 19, wherein each of the first protection component and the second protection component is one of a unidirectional transient voltage suppressor diode, a bidirectional transient voltage suppressor diode, a thyristor, a gas discharge tube and a voltage dependent resistor.

\* \* \* \* \*